March 21, 1961 R. F. LARSEN 2,975,549
CONTROL HANDLE MEANS FOR POWERED TETHERED MODEL AIRPLANES
Filed July 5, 1957
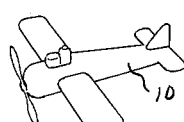
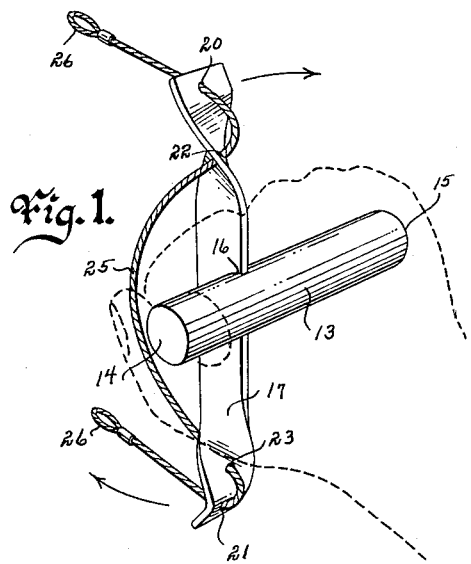
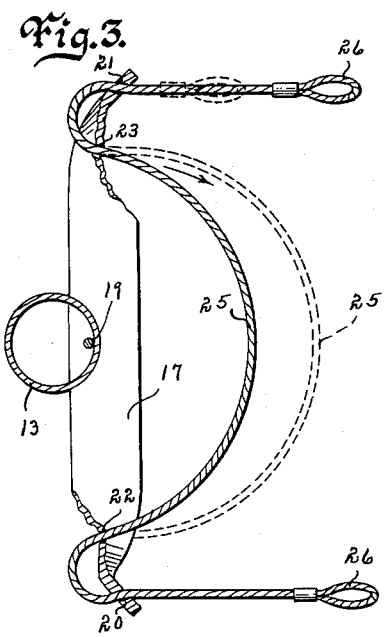
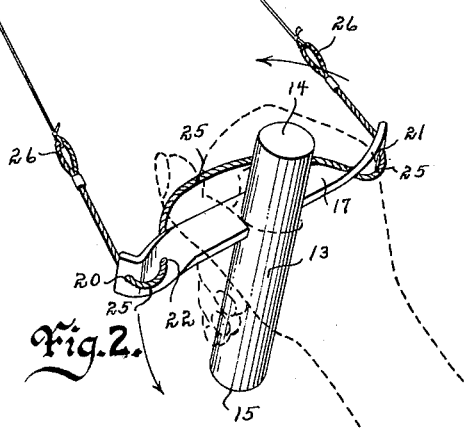
Inventor
Robert F. Larsen
by M. Talbert Dick
Attorney
Witness
Edward P. Seeley United States Patent Office 2,975,549
Patented Mar. 21, 1961

2,975,549

CONTROL HANDLE MEANS FOR POWERED TETHERED MODEL AIRPLANES

Robert F. Larsen, 2723 Easton Blvd., Des Moines 17, Iowa

Filed July 5, 1957, Ser. No. 670,207

1 Claim. (Cl. 46—77)

This invention relates to a control handle means for use in conjunction with tethered powered model airplanes.

The sport of flying small powered airplanes with cables or lines attached to the same and extending to the ground operator has become most popular. Usually two cord cables are employed, which may be secured to the inner wing. To better hold the two ground ends of the cables, many operators developed control handles. In general such handles were of the "horseshoe" type, i.e., the two ends of the ground end of the cables were secured to the two ends of the handle, respectively, and the operator grasped the center portion with one hand. Such handles gave a measure of control, but leverage was against the operator inasmuch as the two ends of the U-shaped handle were remote from the grip area. Furthermore, they were inadequate in successfully manipulating the aircraft into and out of intricate aerobatics such as inverted flight. Furthermore, cable adjustment during flight was almost impossible. Some attempts have been made to overcome some of these objections by making the U-shaped control bracket rotatably and/or adjustably mounted on a separate grip portion. Obviously, such units were heavy, complicated and unnatural in operation during rapid airplane maneuvers.

Therefore, one of the principal objects of my invention is to provide a control handle means for tethered powered model airplanes that is so natural to operate that individuals of short experience can successfully perform rapid and involved acrobatics.

A further object of this invention is to provide a model airplane control handle that connects the two cables at points in close proximity to the operator's grip on the control, thereby providing good leverage in the manual operation of the unit.

A still further object of this invention is to provide a control handle for cables extending to a powered model airplane that has a flat portion extending between the fingers of the user thereby giving more effective grip control.

A still further object of my invention is to provide a model airplane control handle that is light in weight.

A still further object of this invention is to provide a control handle means for powered tethered model airplanes that permits the easy and quick adjustment during flight, of the cables extending from the handle to the aircraft.

Still further objects of my invention are to provide a control handle for tethered powered model airplanes that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device used in the normal flying of an ordinary powered model airplane, Fig. 2 is a perspective view of my control handle being used to fly powered model aircraft in acrobatic maneuvers, and Fig. 3 is an enlarged side view of my device with sections cut away to more fully illustrate its construction.

In these drawings I have used the numeral 10 to designate a powered model airplane. The numerals 11 and 12 designate the two cable cords extending from the aircraft to the control handle. In use, the two cables may be secured in to the inner wing in spaced apart relationship and to the airplane's control mechanism. In the matter of intricate maneuvering of the aircraft, most operators would hold my control handle in a vertical position as shown in Fig. 2. In any type of airplane attachment my control handle is secured to the two ground ends of the cables, and I will now describe my handle unit in detail.

The numeral 13 designates the grip portion of my device. This portion 13 is in the form of an elongated cylinder having an end 14 and an end 15. For purposes of lightness and strength the member 13 may be hollow and of aluminum material. In the forward side wall of the part 13, I cut a slot 16 transversely of the length of the same and nearer the end 14 of the part 13 than it is to the end 15. The numeral 17 generally designates the crossbar of my device. This crossbar 17 is made from an elongated flat strap, the center portion of which is inserted into and fastened in the slot 16. This bar may be rigidly secured to the part 13 by any suitable means such as welding, or running a pin 19 through that portion that extends into the grip part 13, or like. By this construction the width of the bar 17 will extend transversely of the length of the part 13, and the bar in general will extend substantially radially outwardly from the part 13. The bar will, however, be slightly forward of the axis of the cylinder grip part 13, due to the slot being cut in the forward side wall of the same, as shown in Fig. 3. Each of the two outer end portions of the bar is given a one-half twist, and bent forwardly near its tip end as shown in Fig. 2. Thus, the extreme outer tip ends of the bar extend forwardly and the width of each tip end will be parallel with the longitudinal axis of the grip part 13. The numerals 20 and 21 designate holes in the tip end portions respectively of the bar. Inwardly from the hole 20 and near where the bar starts its twist in that end is a hole 22. Inwardly from the hole 21 and near where the bar starts its twist in that end is a hole 23. The two holes 20 and 21 extend forwardly and inwardly and the two holes 22 and 23 extend rearwardly outwardly and laterally, as shown in Fig. 2. The numeral 25 designates a metal twist strand cable having its center length area extending rearwardly through the hole 22, thence forwardly through the hole 20. The other end portion of the metallic cable is threaded rearwardly through the hole 23, thence forwardly through the hole 21. On each of the forward ends of the metallic cable is a loop 26. The two ground ends of the lines 11 and 12 are secured to these two loops, respectively. The metal cable extending between the holes 20 and 22, and the holes 21 and 23, are curved to conform to the curvature of the twisted end portion of the bar. In use, the metal cable between the holes 22 and 23 is very slack, as shown in Fig. 3. This slack will not be taken up by a pull on the outer end of either end of the metal cable due to the binding action of the cable passing through the holes and the lateral twist of the bar at each end. However, to lengthen one cord cable and to thus affect the airplane trim, it is merely necessary to push a length of the metal cable rearwardly through either the hole 22 or 23 (as the case may be). This produces slack back of the bar and which is readily pulled forwardly by the pull of the airplane and thereby lengthening that particular cable cord. Therefore, one or the other cable cords may be lengthened relative to the other, and this may be accomplished during the time the airplane is in flight. With the control handle in position as shown in Fig. 2, the cylinder grip is grasped by the hand with the fingers extending downwardly. The longer end portion of the cylinder grip accommodates the three outer fingers of the hand, and the short end of the cylinder grip at the left side of the bar accommodates the index finger. The flat central area of the bar will extend between the index and second finger. This position of the control handle in the hand is natural but most effective. The device may be held and rotated easily even when only lightly grasped. This means a minimum of fatigue. One way to fly the airplane in inverted flight is to rotate the hand a one-half rotation, bringing the fingers to extend upwardly. The position of the grip at any time, however, depends on the skill and desire of the operator, and the manner of the airplane controls and the hook-up of the wires 11 and 12 thereto. For a left handed person, the device may be hooked up for the short end of the cylinder grip to extend to the right.

Some changes may be made in the construction and arrangement of my control handle means for powered tethered model airplanes without departing from the real spirit and purpose of my invention, and it is my intention to cover by my claim, any modified forms of structure or use of mechanical equivalents which may be reasonably included within their scope.

I claim:

In a model airplane control handle, an elongated grip portion, a strap bar secured directly to said grip portion, having its width extending transversely of the longitudinal length of the grip portion, and having its length extending substantially radially to the elongated grip portion; said bar having an inner and an outer hole in each of its two end portions, and a cable having its two end portions extending first rearwardly through the two inner holes respectively of said bar and thence forwardly through the two outer holes respectively of said bar thereby providing a loop portion of the cable between the two inner holes of the bar; said loop portion adjustable as to size by sliding said cable through the holes of said bar; said bar having each of its outer end portions extending in a one-half twist; said grip portion being in the form of an elongated cylinder.

References Cited in the file of this patent

UNITED STATES PATENTS

| | | |
|---|---|---|
| 1,902,983 | Adler | Mar. 28, 1933 |
| 2,113,839 | Hedges | Apr. 12, 1938 |
| 2,416,805 | Walker | Mar. 4, 1947 |
| 2,527,274 | McIntyre | Oct. 24, 1950 |
| 2,736,133 | Carpenter | Feb. 28, 1956 |
| 2,825,562 | Clarkson | Mar. 4, 1958 |